United States Patent [19]

Welch et al.

[11] 3,922,429

[45] Nov. 25, 1975

[54] COMPOSITE IMPACT ABSORBING SAFETY STRUCTURE

[75] Inventors: John A. Welch, Cuyahoga Falls, Ohio; Robert W. Mitchell, Brown Deer, Wis.

[73] Assignee: The General Tire & Rubber Company, Akron, Ohio

[22] Filed: Oct. 19, 1973

[21] Appl. No.: 408,029

Related U.S. Application Data

[63] Continuation-in-part of Ser. No. 195,260, Nov. 3, 1971, abandoned, which is a continuation-in-part of Ser. No. 796,954, Feb. 6, 1969, abandoned.

[52] U.S. Cl. .................. 428/315; 180/90; 428/332; 428/425; 428/492
[51] Int. Cl.² .......................................... B32B 3/26
[58] Field of Search ...... 161/159, 160, 161; 180/90; 428/332, 425, 492; 296/70

[56] References Cited
UNITED STATES PATENTS

| | | | |
|---|---|---|---|
| 3,042,137 | 7/1962 | Mathues et al. | 161/160 |
| 3,072,582 | 1/1963 | Frost | 161/159 |
| 3,402,520 | 9/1968 | Lee et al. | 161/161 |
| 3,520,769 | 7/1970 | Baker | 161/160 |

*Primary Examiner*—William J. Van Balen
*Attorney, Agent, or Firm*—F. C. Rote, Jr.; James M. Peppers

[57] ABSTRACT

An impact energy absorbing safety structure suitable for automobile dashboards which includes an impact energy absorbing or dissipating deformable rigid expanded foam base member covered on its impact absorbing surface by a porous resilient expanded foam layer member. The base member and the layer member are bonded together by an intermediate tough frangible crust member comprised of a composite of a selected portion of the resilient expanded foam of the layer member which is permeated by a portion of the rigid expanded foam.

8 Claims, 3 Drawing Figures

U.S. Patent Nov. 25, 1975 3,922,429
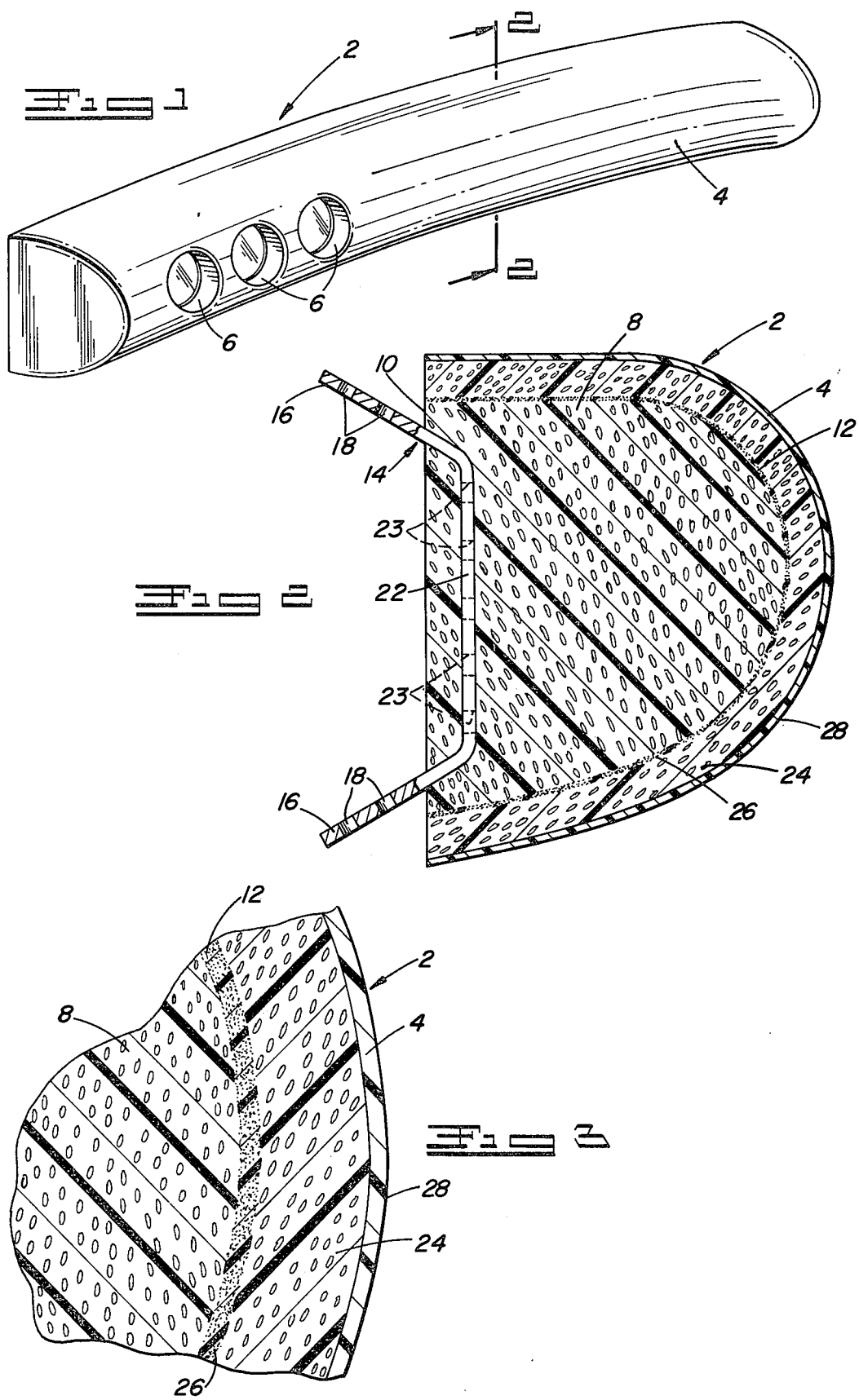

COMPOSITE IMPACT ABSORBING SAFETY STRUCTURE

This application is a continuation-in-part of copending U.S. application Ser. No. 195,260, filed Nov. 3, 1971 which in turn is a continuation-in-part of copending U.S. application Ser. No. 796,954, filed Feb. 6, 1969 and each application now abandoned. This application is also copending with U.S. application Ser. No. 408,040, filed Oct. 19, 1973 which pertains to the method of forming the structure of this invention.

BACKGROUND OF THE INVENTION

This invention generally pertains to impact absorbing safety structures and more particularly pertains to a composite foam impact absorbing structure adapted for installation on the front of an automobile dashboard, for example. Such a structure is sometimes referred to as a crash pad.

DESCRIPTION OF THE PRIOR ART

Plastic foam structures for vehicle padding are disclosed in U.S. Pat. Nos. 3,042,137 and 3,473,951. The "integral" or "self" skins formed on plastic foam structures are disclosed in U.S. Pat. Nos. 3,345,245 and 3,473,951. The permeation of a rigid foamed core into the porous frame of a wall panel is disclosed in U.S. Pat. No. 3,402,520. In addition, plastic foams and methods of preparing plastic foams are disclosed in U.S. Pat. Nos. 3,072,582 and 3,397,158. To the extent pertinent to the following detailed description, the disclosures of the above referenced patents are specifically incorporated as additional information.

SUMMARY OF THE INVENTION

The present invention provides a composite plastic foam impact absorbing safety structure which distributes an impact force over a larger area than a conventional foam structure with a resulting increase in crushable volume being made available for impact absorption.

The present invention also provides an impact absorbing safety structure which is light in weight and easily fabricated.

The present invention also provides an impact absorbing safety apparatus which will permanently deform to absorb energy of selected intensity yet which presents to the touch a soft resilient texture sometimes referred to as "showroom feel".

The foregoing and other provisions and advantages are attained in an impact energy absorbing safety structure suitable for automobile dashboards which includes an impact energy absorbing or dissipating deformable rigid expanded foam base member covered on its impact absorbing surface by a porous resilient expanded foam layer member. The base member and the layer member are bonded together by an intermediate tough frangible crust member comprised of a composite of a selected portion of the resilient expanded foam of the layer member which is permeated by a portion of the rigid expanded foam. The layer member may comprise a flexible resilient polyurethane foam having a density less than about 8 lbs./ft.$^3$. A flexible covering member may cover and conform to the outer surface of the layer member. The crust may have an apparent density of about 8 to 30 lbs./ft.$^3$. The crust may also have an apparent thickness of about 1/16 inches. The base member may comprise a rigid polyurethane foam having a density less than about 8 lbs./ft.$^3$. Other materials may be utilized for the base member and the layer member as later described.

BRIEF DESCRIPTION OF THE DRAWINGS

FIG. 1 shows an impact absorbing structure constructed according to this invention;

FIG. 2 is a cross-sectional view of the structure shown in FIG. 1, taken along the line 2—2 in FIG. 1; and FIG. 3 is a greatly enlarged sectional view of a portion of the structure of FIG. 2.

DESCRIPTION OF THE PREFERRED EMBODIMENT

FIG. 1 shows an impact absorbing structure constructed according to this invention. In FIG. 1, impact absorbing structure 2 is designed as an automobile dashboard crash pad. Structure 2 has contours 4, conforming to a desired shape. Apertures 6 in structure 2 are provided to receive automobile instruments such as a speedometer, fuel gauge, temperature gauge and the like.

In FIG. 2, structure 2 is comprised of a base member 8, a thin, flexible resilient foam layer member 24, and covering member 28. Base member 8 is made of rigid yet deformable plastic foam, to absorb impact energy, and comprises a first portion 10 and a second portion 12. The rigid plastic foam making up base member 8 should have a density below about 8 lbs./ft.$^3$ to provide the best combination of weight, material cost, and impact absorbing ability.

First portion 10 contains fastening means 14 for fastening structure 2 to the vehicle enclosure. As shown here, fastening means 14 may comprise flanges 16, each flange having a plurality of apertures 18 to accept bolts and/or rivets in connecting structure 2 to the vehicle enclosure. Flanges 16 are the exterior projections of anchor plate 22. Anchor plate 22 may be a narrow metal strip embedded in the foam of base member 8, installed during the foaming of base member 8. Anchor plate 22 contains apertures 23 to receive foam therethrough and thereby rigidly fix anchor plate 22 and flanges 16 with respect to impact absorbing structure 2. A plurality of such plates are spaced along the length of structure 2.

Second portion 12 of base member 8 is shaped generally to contours 4 and contains a portion of the thin, flexible resilient foam layer member 24. Flexible foam layer 24 is composed of porous, substantially unstressed, flexible and resilient foam and provides partial protection to base member 8 from minor impacts, cushioning of objects impacting structure 2, absorbs noise and vibration from the vehicle, and gives structure 2 its showroom feel. The foam is substantially unstressed to provide the best possible feel and hold contours 4 free from unwanted bulges. Severely stressed flexible foam tends to impair the impact load distribution of structure 2. The porous, substantially unstressed, flexible foam, making up foam layer 24, should have a density less than about 8 lbs/ft.$^3$. Its thickness may vary to give a desired feel but will usually be between ¼–½ inch thick. Some examples of materials within the term "plastic foam" include phenolic foams, ploystyrene foams, cellular acetate foams, and polyurethane foams. The term "flexible foam" includes both flexible plastic and elastomeric foams.

There are three broadly acknowledged classes of plastic foams: rigid, semi-rigid and flexible. In addition, other flexible foams may be made from elastomers. Some examples of these elastomers are natural rubber and synthetic rubbers such as acrylic rubbers, chlorosulfonated polyethylenes, epichlorohydrin rubbers, ethylene-propylene copolymers, ethylene-propylene-diene terpolymers, fluoro-elastomers, isobutylene-isoprene (butyl) rubbers, isopreneacrylonitrile rubbers, nitrile rubbers, polybutadienes, polychloroprenes, polyisobutylenes, polyisoprenes, polysulfides, silicone rubbers and styrene-butadiene rubbers.

Flexible foams have high energy rebound characteristics and, because of this, are used as cushions rather than an impact absorbers. semi-ridig plastic foams possess a certain degree of impact absorbing capability and presently find use in automobile crash pads as described above. Rigid plastic foam is an outstanding impact absorbing material; however, it possesses disadvantages that have heretofore prevented its utilization as an impact absorbing structure.

Of the many types of plastic foams that may be used in this invention, polyurethane foam is preferred because of its may desirable properties such as ease of manufacture, chemical inertness, and high strength and modest cost. Methods of preparing polyurethane foams are well-known in the art. See the above referenced patents, for example, or the publications, *Polyurethane Foams*, Edited by T. T. Healy, A.I.R.I., London, Iliffe Books, Ltd. (1963) and *Plastics Engineering Handbook*, Third Edition, Reinhold Publishing Corporation (1960).

These foams can be made flexible, semi-rigid and rigid by varying the starting materials and foaming conditions (crosslinking, temperature, etc.). These foams may be made in density ranges of about 1 lb./cu.ft. to 10 lbs./cu.ft. Generally, the flexible and rigid polyurethane foams contemplated in this invention have densities in the above range but generally less than about 8 lbs./cu.ft. In addition, polyurethane foams can be compounded to develop in-situ a nonporous, flexible outer skin commonly known as "integral skin".

In FIGS. 2 and 3, crust 26 is shown at the interface of second portion 12, of base member 8, and flexible foam layer 24. Crust 26, produced by the novel process later described, is a composite comprised of a portion or zone of foam layer 24 which is permeated by the plastic foam portion 12 of the base member 8. Crust 26 is rigid and may have an apparent density of 8–30 lbs./ft.$^3$ and an apparent thickness of about 1/16 inch. The term "apparent" is used because crust 26 is produced in the process of making structure 2 and is not separable from base member 8 or flexible foam layer 24; thus, the density and thickness can only be estimated. Crust 26 is a relatively high density, frangible, rigid foam and serves a number of functions. It protects rigid foam base member 8 from denting due to minor impacts. Without provision of crust 26, base member 8 would not be sufficiently protected from denting by flexible foam layer 24. Crust 26 also provides an extremely tough, permanent chemical and mechanical bond between base member 8 and flexible foam layer 24. Further, it distributes initial impact energy over a wide area of base member 8, prior to breaking under the impact, so that the adjacent rigid foam is utilized to absorb or dissipate impact energy. The effect of crust 26 spreading the impact energy, prior to being broken itself, aids structure 2 in absorbing energy in more gradual fashion.

Overlying flexible foam layer 24 is covering member 28. Covering member 28 may be a polymeric sheet material such as a vinyl halide polymer or natural material such as leather. Covering 28 may be fully adhered to layer 24 by an adhesive, to prevent shifting of the covering with respect to flexible foam layer 24, or nonadhered to allow inter layer shifting depending upon the requirements of structure 2. In both cases, covering 28 is fixed to layer 24 at its perimeter such as by adhesive as is well known in the art.

Covering 28 may also be an integral skin of the plastic foam of foam layer 24 as well known in the art. Integral skin is known in the art as a nonporous, polymeric, flexible, in-situ developed skin on plastic foam. The nonporous nature of covering 28 aids in preventing entrance of engine vapors into the vehicle enclosure. Moreover, integral skin requires substantially less ultra-violet stabilizers, (usually organometal complexes) with concomitantly less fogging problems (e.g., windshield fogging) than is encountered in the case of vinyl halide polymers utilizing more of the stabilizers.

The basis of this invention is the discovery that a novel impact absorbing structure may be made of a rigid plastic foam having an overlay of flexible foam characterized by a frangible, high density, rigid foam crust intermediate the rigid foam and the flexible foam. As used "frangible" means breakable under impact of selected magnitude.

The structure 2 has an outer covering of either a sheet material or has an integral skin formed on the flexible foam. the flexible foam in combination with the high density, rigid plastic foam crust prevents the rigid foam from being dented or deformed by light impacts. Moreover, the combination of flexible foam and high density material of crust 26 acts to spread initial and light impact energy over a large area of the rigid material. The result is a light weight impact absorbing structure that does not require a heavy metal base.

This invention structure with its frangible, high density, intermediate rigid foam crust and layer of foam with outer covering or integral skin provides a wear resistant, light weight structure that is easily fabricated and contoured into a variety of shapes and is capable of a variety of decorative finishes; is moisture and stain resistant, easily washable and has a good showroom feel.

DESCRIPTION OF THE FABRICATION METHOD

The method of making this inventive structure generally comprise the steps of conforming covering member 28 on the surface of a mold; conforming the thin, flexible resilient foam layer member 24 over covering member 28; pouring a foaming mixture of rigid-type plastic foam reactants onto flexible foam layer 24 to produce freely expanded, nonporous, rigid foam base member 8; and curing the foam.

Covering 28 is placed on the surface of the mold; the mold conforms to contours 4. The covering may be placed by hand, vacummed formed into place by conventional vacuum techniques, or made in place by other conventional techniques such as slush molding.

The thin layer of substantially unstressed, flexible form 24 is next laid in contact over covering 28. Alternatively, a thin coating of adhesive may be first applied to covering 28 so that foam layer 24 will be bonded to covering 28. Alternatively, a mixture of flexible type foam reactants may be poured, in a thin layer, over covering 28 to develop, substantially unstressed, into thin, flexible foam layer 24. In this method the thin integral skin or membrane, formed on the exposed surface of foam layer 24, must be removed to permit limited penetration by the rigid plastic foam of base member 8 to establish crust 26.

A foaming mixture of rigid type plastic foam reactants is then poured onto flexible foam layer 24. It is crucial to the proper development of crust 26, intermediate the flexible foam layer 24 and the rigid foam base member 8, that the mixture be well into the foaming stage when poured onto flexible foam layer 24. The foaming mixture will penetrate (permeate) only slightly into flexible foam layer 24 because the billowing foam, generating from the mixture, reduces the penetrating ability of the mixture. Without this foaming condition present, the foam reactants would penetrate deeply into flexible foam layer 24, resulting in a final structure with virtually no desirable feel.

The rigid type foam reaction is allowed to proceed unrestrained. The rising foam encompasses the fixed fastening means (anchor plate 22), described before, so that it is rigidly anchored in the final foam structure. The foam is then cured by addition of energy, usually in the form of heat. Alternatively, the rigid type foam and the flexible type foam may be compounded so as to eliminate high temperature post curing.

The purpose of trying to obtain a hard interfacial crust 26 between the flexible and rigid is to obtain a composite as shown in FIGS. 2 and 3 which exhibits an initial resistance to minor loads or impacts, so that the energy absorption capacity of the composite is not significantly affected for major impacts. Since rigid foam surfaces and particularly cut surfaces are friable, their resistance to minor loads or impacts is small to the extent that significant damage could easily be caused to rigid foam having such a surface. For example, a person could easily bump an elbow or push his hand against the instrument panel in entering or maneuvering in a car. The existence of the crust 26 or strength membrane intermediate the rigid foam (energy absorbing portion) of member 8 and flexible foam (soft feel) of member 24 provides protection to the rigid foam for minor loads (50 pounds or less) while not significantly influencing higher impact loads.

To evaluate the resistance of such a composite, several samples were made including a layer of approximately 1 inch thick, open celled flexible foam, and a layer of rigid foam. The material for the rigid foam in a liquid state was poured onto the flexible foam. The rigid foam had variations in the catalyst and/or mix time such that the viscosity of the gel or cream varied. A control structure was also evaluated, the sample consisting of separate cut pieces of rigid and flexible foam with no integral intermediate crust of any kind. Similar densities of the two foams were maintained for all samples. Variations between samples were as follows:

|  | SAMPLE | | | |
| --- | --- | --- | --- | --- |
|  | A | B | C | D |
|  | Control | | | |
| Catalyst (%) | 100 | 100 | 80 | 50 |
| Mix Time (Sec.) | 20 | 20 | 20 | 10 |
| Ave. Crust Thickness (in.) | 0 | .08 | .10 | .24 |
| Crust Density (lb./ft.$^3$) | 0 | 9.38 | 8.94 | 9.33 |
| Rigid Foam Density (lb./ft.$^3$) | 2.01 | 1.94 | 2.03 | 1.98 |
| Flexible Foam Density (lb./ft.$^3$) | 1.13 | 1.21 | 1.23 | 1.18 |

The above properties are similar to those that meet impact requirements in automobile instrument panel applications.

Load deflection tests were run on these samples by placing a plunger in the form of a 1 inch diameter rod with a hemispherical end against the flexible material. Because of the difficulty in visually zeroing in against the flexible foam and because the initial thickness of flexible foam varied slightly (±3%) between samples, all deflection measurements were taken after an initial 2 lb. preload. Listed below in Table I are the deflection results. An average of 3 readings were taken for each data point.

TABLE I

|  | SAMPLE | | | |
| --- | --- | --- | --- | --- |
|  | A | B | C | D |
|  | Control | | | |
| Load (Lbs.) | Deflection (In.) | | | |
| 5 | .25 | .19 | .16 | .08 |
| 10 | .31 | .23 | .20 | .13 |
| 30 | .50 | .37 | .31 | .25 |
| 50 | .70 | .54 | .49 | .39 |

The results show that the penetration and/or damage is reduced as the crust thickness increases. Also the amount of energy absorbed decreased with crust thickness. All variations showed that the energy absorbed was essentially dissipated.

An alternate method of making the inventive structure comprises pouring a mixture of flexible-type foam reactants, compounded to produce an in-situ integral skin onto the surface of the mold and allowing thin, flexible foam layer 24 to develop substantially unstressed with an integral skin adjacent the mold surface. The use of a second mold portion, in spaced relationship to the first mold portion, is contemplated in this method. Such use of both mold portions will not impair or adversely affect the substantially unstressed condition of flexible foam layer 24 from developing. As described earlier, the thin membrane forming on top of the flexible foam layer must be removed to permit limited penetration by the rigid foam. Thereafter, a foaming mixture of rigid type foam is poured onto flexible foam layer 25, as described above, and the foam is cured. The foaming mixture of rigid type foam reactants will penetrate slightly into flexible foam layer 24 and will form high density, rigid foam crust 26 as hereinbefore described.

This two-foam structure, with its integral skin possess advantage over the three component structure, i.e., rigid foam, flexible foam, and covering. In the case of using a vinyl or other thermoplastic based covering member 28, a flexible polyurethane foam layer member 24 and a rigid polyurethane foam base member 8, the foam curing temperature is limited to the low heat distortion temperature of the covering (about 75°–85°C.). However, the two foam, integral skin polyurethane structure, described above, is limited only by its high degradation temperature (about 100°–110°C.) which is well above its curing temperature range. Moreover, the two-foam structure, with its composite intermediate crust and integral skin, eliminates the costly steps of cutting, placing and adhering the covering and flexible foam layer on the surface of the mold.

The final structure 2 utilizes the outstanding energy absorbing property of rigid plastic foam and eliminates the disadvantages of poor abrasion resistance and denting.

The new method of making this structure, including the formation of a high density rigid foam crust 24 to spread initial impact energy over the structure 2 and to eliminate dents due to light impacts, provides an advanced impact absorbing safety structure.

The foregoing description and drawings will suggest other embodiments and variations to those skilled in the art, all of which are intended to be included in the spirit of the invention as herein set forth.

That being claimed is:

1. An impact energy absorbing safety structure such as an automobile dashboard comprising:
   A. a deformable impact energy absorbing rigid expanded foam base member having a surface of selected contour;
   B. a porous flexible resilient expanded foam layer member covering said impact absorbing surface; and
   C. said base member and said layer member being bonded together by an intermediate tough frangible crust member adapted to initially protect said base member against deformation and adapted to break responsive to a concentrated impact force in excess of a selected force, said crust member being comprised of a composite of a selected porous portion of said layer member which porous portion is permeated by a selected portion of the expanded foam of said base member.

2. The structure of claim 1 wherein said crust member has an apparent thickness of about 1/16 inch.

3. The structure of claim 1 wherein said layer member includes an integral skin disposed opposite said base member.

4. The structure of claim 1 wherein said crust member is adapted to break responsive to a concentrated impact force in excess of about 50 lbs.

5. The structure of claim 1 wherein said base member is comprised of a composition selected from the group consisting of polyurethane, phenolic, polystyrene and acetate.

6. The structure of claim 1 wherein said layer member is comprised of an elastomer selected from the group consisting of polyurethane, natural rubber and synthetic rubber.

7. An impact energy absorbing safety structure such as an automobile dashboard comprising:
   A. a deformable impact energy dissipating rigid expanded foam base member having a surface of selected contour;
   B. a porous flexible resilient substantially unstressed expanded foam layer member covering said impact absorbing surface; and
   C. said base member and said layer member being bonded together by an intermediate tough crust member adapted to initially protect said base member against deformation and adapted to break responsive to a concentrated impact force in excess of a selected impact force, said crust member being comprised of a composite of a selected porous portion of said layer member which porous section is permeated by a selected portion of the expanded foam of said base member.

8. An impact energy absorbing safety structure such as an automobile dashboard comprising:
   A. a deformable impact energy absorbing rigid expanded foam base member having a surface of selected contour;
   B. a porous flexible resilient substantially unstressed expanded foam layer member covering said impact absorbing surface;
   C. said base member and said layer member being bonded together by an intermediate tough frangible crust member adapted to initially protect said base member against deformation and adapted to break responsive to a concentrated impact force in excess of a selected impact force, said crust member being comprised of a composite of a selected porous portion of said layer member which is permeated by a selected portion of the expanded foam of said base member; and
   D. a flexible surface covering member overlying the outer surface of said layer member opposite said base member and bonded to said outer surface.

* * * * *